United States Patent [19]

Zimmermann

[11] Patent Number: 5,282,602

[45] Date of Patent: Feb. 1, 1994

[54] ARRANGEMENT FOR FASTENING A MACHINE PART TO A FOUNDATION

[75] Inventor: Hans Zimmermann, Mönchaltorf, Switzerland

[73] Assignee: Asea Brown Boveri Ltd., Baden, Switzerland

[21] Appl. No.: 946,590

[22] Filed: Sep. 18, 1992

[30] Foreign Application Priority Data

Nov. 29, 1991 [DE] Fed. Rep. of Germany ....... 4139387

[51] Int. Cl.$^5$ .............................................. F16M 3/00
[52] U.S. Cl. ...................................... 248/680; 248/678
[58] Field of Search ............. 248/637, 673, 676, 678, 248/679, 680, 500, 507, 188.4; 52/704, 706, 707, 708

[56] References Cited

U.S. PATENT DOCUMENTS

| | | | |
|---|---|---|---|
| 2,952,947 | 9/1960 | White | 52/708 |
| 3,450,427 | 6/1969 | Fischer | 52/704 X |
| 3,851,626 | 12/1974 | Boyd et al. | 248/678 X |
| 4,029,275 | 6/1977 | Erismann | 248/500 X |
| 5,110,082 | 5/1992 | Rowan, Jr. | 248/678 |

FOREIGN PATENT DOCUMENTS

| | | |
|---|---|---|
| 2011468 | 10/1970 | Fed. Rep. of Germany . |
| 7631850 | 2/1977 | Fed. Rep. of Germany . |
| 7635615 | 3/1977 | Fed. Rep. of Germany . |
| 2642590 | 3/1978 | Fed. Rep. of Germany . |
| 3216232 | 11/1983 | Fed. Rep. of Germany . |
| 983089 | 1/1949 | France . |
| 2589222 | 4/1987 | France . |
| 584865 | 2/1977 | Switzerland . |

Primary Examiner—Ramon O. Ramirez
Attorney, Agent, or Firm—Oblon, Spivak, McClelland, Maier & Neustadt

[57] ABSTRACT

In the arrangement for fastening a machine part on a foundation by using vertical anchor studs, a multiplicity of vertical anchor tubes are cast into the foundation and these are connected to one another, at least in groups, by means of an auxiliary frame. Provided at the lower end of each anchor tube, there is a ring whose inner diameter is greater than the outer diameter of the anchor stud and whose outer diameter is greater than or at least equal to the outer diameter of the anchor tube. A space with an essentially square outline is recessed in the foundation underneath this ring. Laid in this space with clearance, there is a threaded nut with an essentially square external contour and a height smaller than the clear height of the space mentioned, the lower end of the anchor stud being able to be screwed into this threaded nut. This design makes it possible to omit expensive templates when casting the foundation. In addition, the subsequent horizontal alignment of the machine part or machine is possible without difficulty.

9 Claims, 3 Drawing Sheets

ARRANGEMENT FOR FASTENING A MACHINE PART TO A FOUNDATION

BACKGROUND OF THE INVENTION

1. Field of the Invention

The invention concerns an arrangement for fastening a machine part on a foundation by using vertical anchor bolts or anchor studs.

The invention makes reference to a state of the art such as is given, for example, in DE-A 26 42 590.

2. Discussion of Background

In the erection of large electrical machines or heat engines, particular attention has to be paid to fixing the machine and/or bearing casing in order to ensure an accurate and enduring alignment and so that the forces arising can be safely introduced into the foundation. For this purpose, it was previously usual to place the base plate or bearing feet of the machine casing or bearing casing on an intermediate plate laid on the concrete foundation. The forces arising were transmitted to the intermediate plate via pins or fitting pieces. The intermediate plate itself was in turn connected to the foundation, in the vertical direction, by means of anchor bolts and, in the horizontal direction, by means of form-fit steel sections cast in the foundation. Because such an intermediate plate is complicated and the danger exists that large horizontal forces cannot be fully absorbed, the patent application mentioned at the beginning proposes that a strengthened base plate be used and the bearing casing placed directly on the foundation and clamped by anchor bolts to the latter. In order to absorb horizontal forces, a stud let vertically into the concrete foundation is provided whose head ends in a corresponding recess in the base plate. In order to ensure clearance-free force transmission, the stud head consists of a welded-on ring with an outer diameter which is greater than that of the stud, this ring lying as a form fit in the base plate recess mentioned.

In the known fastening arrangement, complicated and expensive templates are necessary when the anchor bolts are cast into the foundation in order to ensure exact positioning of the anchor bolts. The positioning of the studs (for accepting horizontal forces), on the other hand, is much less critical because the stud head does not have to be welded onto the stud until later.

SUMMARY OF THE INVENTION

Accordingly, one object of the invention is to provide a novel arrangement for fastening a machine part on a foundation, this arrangement making expensive templates unnecessary and, in addition, permitting the subsequent positioning, if required, of the machine part relative to the foundation after the latter has been produced.

This object is achieved according to the invention by casting in the foundation a multiplicity of vertical anchor tubes which are connected together, at least in groups, by means of an auxiliary frame, by providing at the lower end of each anchor tube a ring whose inner diameter is greater than the outer diameter of the anchor stud and whose outer diameter is greater than or at least equal to the outer diameter of the anchor tube, by recessing a space in the foundation underneath this ring with an essentially square outline and by laying in this space, with clearance, a threaded nut with an essentially square external contour and a height smaller than the clear height of the space mentioned, the lower end of the anchor stud being able to be screwed into this threaded nut.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
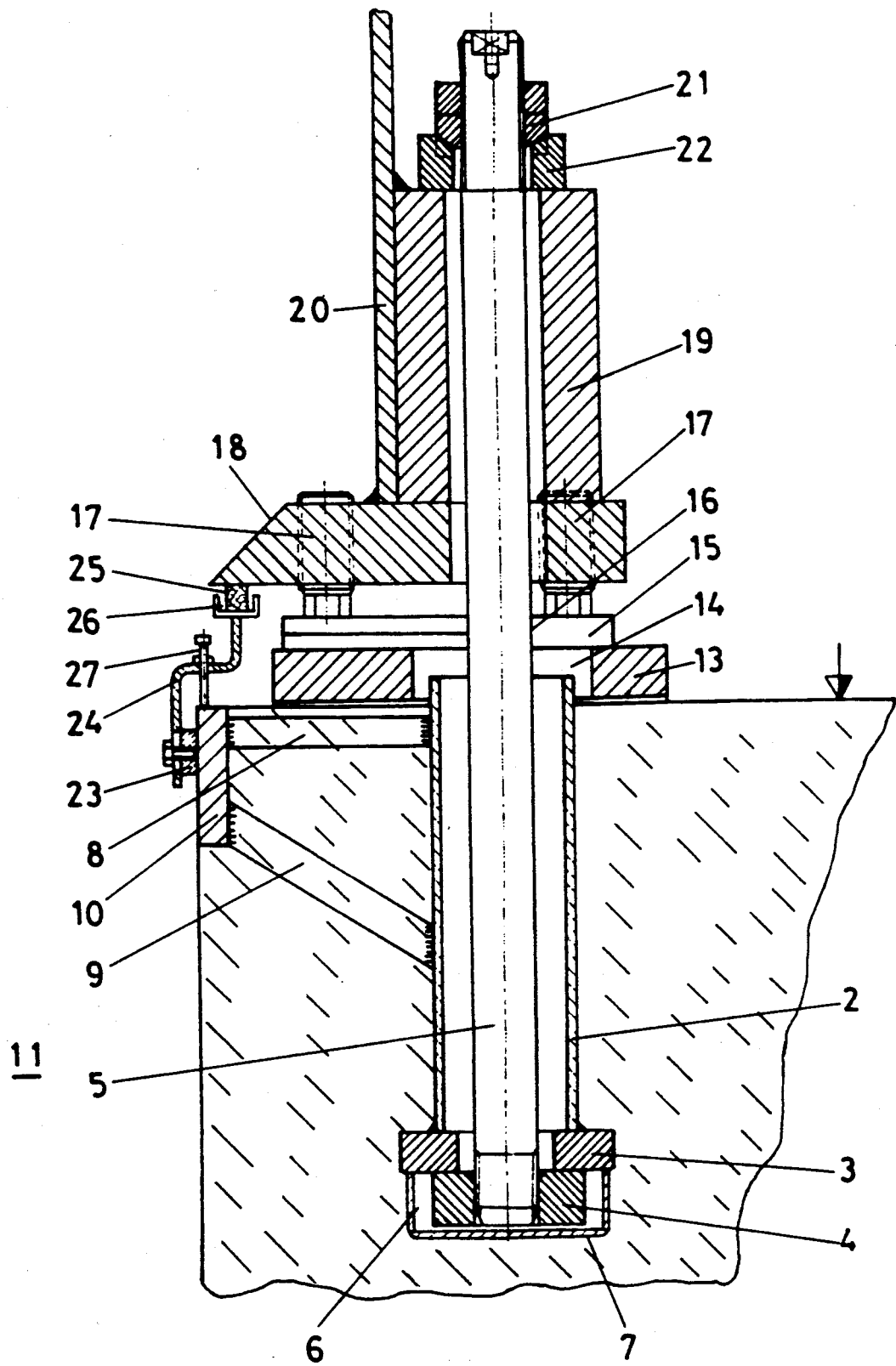
FIG. 1 shows a longitudinal section transverse to the center line of the machine and through a fastening arrangement for an air-cooled turbogenerator in which the auxiliary frame is used simultaneously as the receiving means for the air seal.

Referring now to the drawings, wherein like reference numerals designate identical or corresponding parts throughout the several views, FIG. 1 shows vertically extending anchor tubes 2 cast into the machine foundation 1. A ring 3 of a perforated plate is welded onto the lower end of the anchor tube 2. The outer diameter of the ring 3 is larger than the outer diameter of the anchor tube 2. This ring 3 is used, on the one hand, for anchoring the anchor tube 2 in the foundation 1 and, on the other, it forms the contact surface for a threaded nut 4 at the lower end of an anchor stud 5. This anchor stud can consist, economically, of high-strength bar material with a rolled thread at both ends. The inner diameter of the ring 3 is greater than the outer diameter of the anchor stud 5. The threaded nut 4 has a square cross-section. It is located in a space 6 below the ring 3. This space is formed by the inside of a sheet metal cap 7 which has previously been welded, so as to be gas tight, on the bottom of the ring 3. The space 6 also has a square base with a width (length) smaller than the diagonal of the threaded nut 4. The height of this space 6 is greater (typically a few millimeters) than the height of the threaded nut 4. If the anchor stud 5 is screwed into the threaded nut 4, the nut can only turn with it to a slight extent before its edges come into contact with the side walls of the cap 7. This permits the anchor stud 5 to be displaced horizontally, within certain limits, inside the anchor tube 2.

Figure 2:
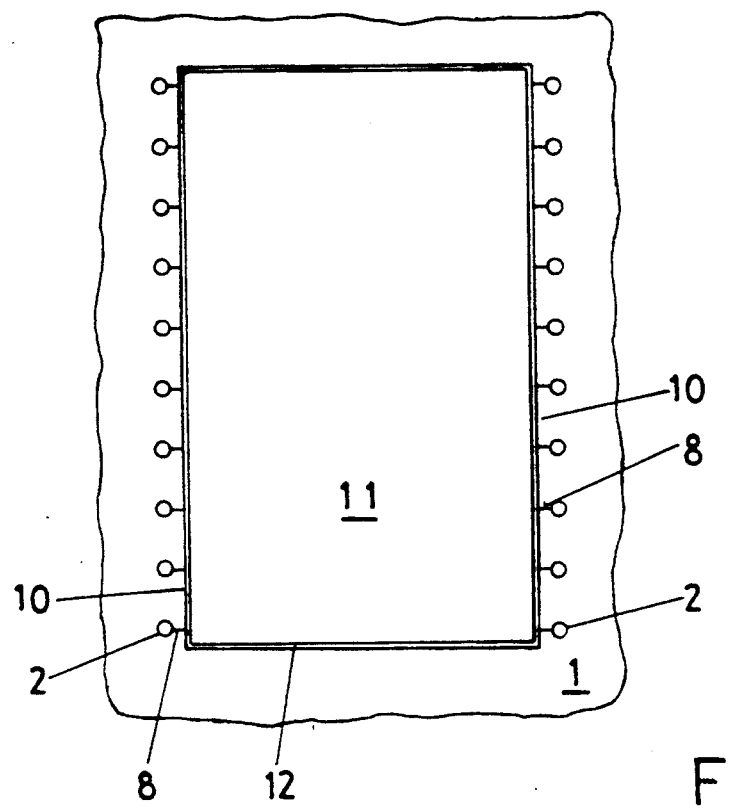
FIG. 2 shows a diagrammatically simplified plan view of the machine foundation of FIG. 1.

Two connecting straps 8, 9 are welded onto the sides of the anchor tube 2 and these lead to a longitudinal rail 10 where they are again welded. As may be seen from the plan view of FIG. 2, these longitudinal rails 10 bound the upper longitudinal edges of a foundation pit 11 which is used, in the example, as the cold air space of an air-cooled turbogenerator. Transverse rails 12, which are connected to the longitudinal rails 10, correspondingly bound the upper termination of the foundation pit 11.

In this way, anchor tubes 2, together with the threaded nuts laid in them, and the auxiliary frame consisting of connecting straps 8, 9 and longitudinal and transverse rails 10 and 12 can be aligned and provisionally fixed before the casting of the machine foundation. After the casting of the foundation, the exact relationship of the anchor tubes with respect to one another and with respect to the rails 10, 12 as well as with respect to other fixed points, e.g. a driving machine or prime mover, are exactly maintained.

After the machine foundation formed in this way has been produced, the machine part- or the whole machine, the generator in the present example, is placed on the foundation 1 with the so-called wedging inbetween. This wedging, known per se, essentially includes a plate 13 with a circular opening 14, into which protrudes the projecting end of the anchor tube 2, and a support plate 15 with a hole 16 for receiving the anchor stud 5. The support plate acts as the abutment for adjustment studs 17 which are screwed into the generator foot 18 and are used for the exact vertical alignment of the machine. A metal block 19, which is welded both to the generator foot 18 and to the generator casing 20, is used to distribute the pressure. The anchor studs 5 are not introduced and screwed into the threaded nuts 4 until after the erection work described. Before the final tightening of the upper threaded nuts 21, which are crowned on one side and interact with correspondingly crown-shaped support rings 22, the machine can now also be aligned in the horizontal direction because the anchor studs 5, together with their lower threaded nuts 4, can be displaced horizontally in the anchor tubes 2 and, in fact, transversely and/or longitudinally. It is only after complete alignment that the upper threaded nuts are finally tightened.

The design described above is particularly suitable for air-cooled turbogenerators whose cold air space is formed by the foundation pit 11 under the machine. In this case, the invention offers an easy way of simplifying the air seal, at least on the side extending parallel to the longitudinal center line of the machine. This is shown, as an example, in FIG. 1. Nuts 23 are distributed over the length of the longitudinal rails 10 and welded onto them and a Z-section sealing plate 24 is bolted onto them. The free end of the sealing plate 24 is provided with an elastic seal 25 which is located in a groove 26. The bottom of the generator foot 18 forms the other sealing surface. An adjustment screw 27 in the central, horizontal section of the sealing plate 24 is used for adjusting the contact pressure on the seal.

Figure 4:
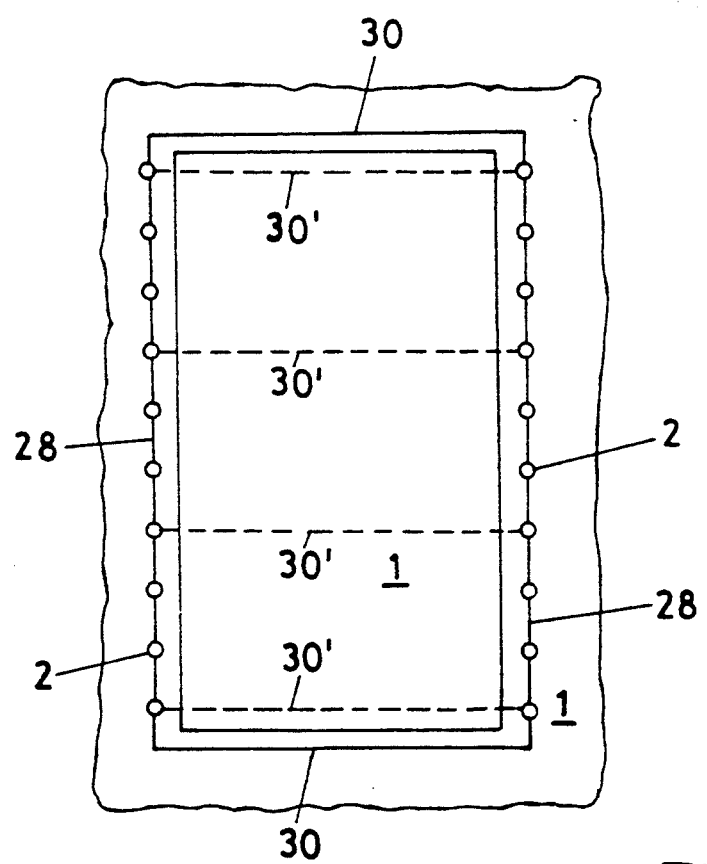
FIG. 4 shows a diagrammatically simplified plan view of the machine foundation of FIG. 3.
Figure 3:
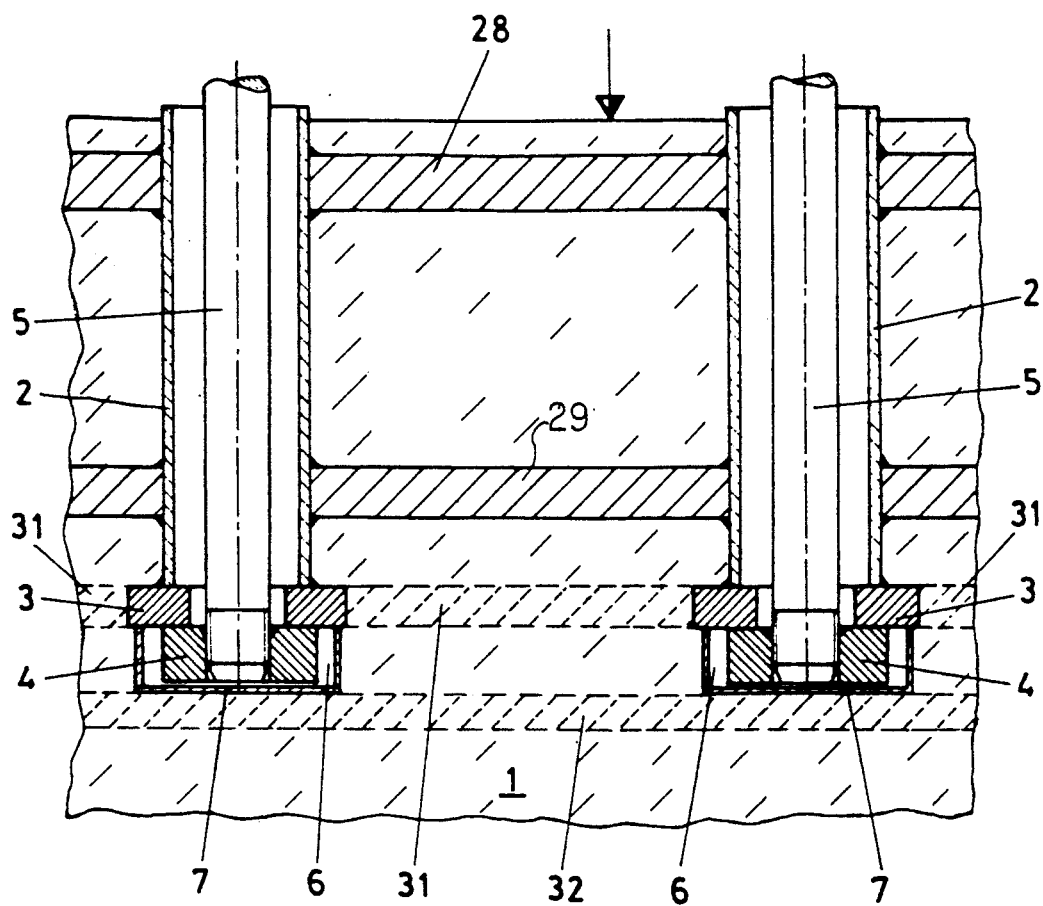
FIG. 3 shows a longitudinal section parallel to the center line of the machine and through a fastening arrangement for a different machine in which the auxiliary frame is completely embedded in the foundation.

A modification of the fastening arrangement of the invention, which is suitable for general machine fastening, is shown in FIGS. 3 and 4. In this, a frame forming the upper termination of the foundation pit is omitted. The auxiliary frame consists only of connecting straps 28, 29 which connect the anchor tubes 2 to one another, parallel to the longitudinal direction of the machine, and which are welded to the anchor tubes 2 in each case. The anchor tubes 2 associated with one longitudinal side of the machine can, but do not have to be connected by transverse rods 30 to those on the other longitudinal side of the machine. In addition, the anchor tubes 2 of one machine side can be subdivided into two or more groups. All the connecting straps 28, 29 and the transverse rods 30 are completely embedded in the foundation 1.

A first modification to this design is shown in dashed lines in FIG. 3. The rings 3 are connected to one another by means of connecting straps 31, in which case it is then possible to omit at least the lower connecting straps 29. Another alternative provides for the rings 3 to be designed integrally with the connecting straps 31.

A second modification provides for the connecting elements between the individual anchor tubes 2 or rings 3 to be achieved directly by means of the cap 7, the cap 7 being placed on continuous steel strips 32 (shown as dashed lines in FIG. 3) and being welded to them. Such a design offers advantages in the production of the foundation 1 because the steel reinforcement (not shown) above the steel strips 32 can be introduced between the anchor tubes 2 without hindrance from the connecting elements (e.g. parts 28, 29). As an option, however, upper connecting straps 28 can also be provided in this solution for fixing the position of the anchor tubes 2 during the course of the production of the foundation.

The design presented in FIGS. 3 and 4 is also suitable for arrangements without foundation pit. In such a case, the transverse rods 301 could be arranged in a way such as is shown by dashed lines in FIG. 4.

A common feature of all the embodiments described is that the cast-in anchor tubes 2 can be laid with relatively large tolerances relative to one another and in their distribution over the foundation, the only proviso being that the inserted "floating" threaded nuts 4 and the anchor studs 5 screwed into them can be displaced in the horizontal direction sufficiently far for them to agree with the tolerances of the fastening holes in the generator feet 18 and their geometrical distribution.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An arrangement for fastening a machine part on a foundation by using vertical anchor studs, wherein, cast in the foundation there is a multiplicity of vertical anchor tubes which are connected together, at least in groups, by means of an auxiliary frame, wherein a ring or a perforated plate is provided at a lower end of each anchor tube, an inner diameter of said ring or perforated plate being greater than an outer diameter of the anchor stud and an outer diameter of said ring or perforated plate being greater than or at least equal to an outer diameter of the anchor tube, wherein a space is recessed in the foundation underneath said ring with an essentially square outline and a threaded nut with an essentially square external contour and a height smaller than a clear height of said space is laid with clearance into said space, a lower end of the anchor stud being able to be screwed into said threaded nut;

wherein the auxiliary frame comprises connecting straps extending transverse to a machine longitudinal center line, and longitudinal rails extending parallel to the machine longitudinal center line.

2. The arrangement as claimed in claim 1, wherein the space is formed by a cap which is connected to the ring from underneath.

3. The arrangement as claimed in claim 1, wherein the longitudinal rails extend on both sides of the machine part and are connected by transverse rails.

4. The arrangement as claimed in claim 1 or 3 for fastening an air-cooled electrical machine, wherein at least the longitudinal rails are used as a receiving means for an air seal.

5. The arrangement as claimed in claim 4, wherein sealing plates are fastened at least on the longitudinal rails, said sealing plates interacting with sealing surfaces on a casing feet of the machine.

6. The arrangement as claimed in claim 7, wherein the auxiliary frame comprises of a steel strip extending underneath the caps and parallel to the machine longitudinal direction, the steel strip being connected to the caps.

7. An arrangement for fastening a machine part on a foundation by using vertical anchor studs, wherein, cast in the foundation there is a multiplicity of vertical anchor tubes which are connected together, at least in groups, by means of an auxiliary frame, wherein a ring or a perforated plate is provided at a lower end of each anchor tube, an inner diameter of said ring or perforated plate being greater than an outer diameter of the anchor stud and an outer diameter of said ring or perforated plate being greater than or at least equal to an outer diameter of the anchor tube, wherein a space is recessed in the foundation underneath said ring with an essentially square outline and a threaded nut with an essentially square external contour and a height smaller than a clear height of said space is laid with clearance into said space, a lower end of the anchor stud being able to be screwed into said threaded nut;

wherein the auxiliary frame comprises connecting straps which connect the individual anchor tubes with one another in a machine longitudinal direction and which are fastened to said rings or are formed integrally with said rings.

8. The arrangement as claimed in claim 7, wherein the space is formed by a cap which is connected to the ring from underneath.

9. The arrangement as claimed in claim 8, wherein the auxiliary frame comprises a steel strip extending underneath the caps and parallel to the machine longitudinal direction, the steel strip being connected to the caps.

* * * * *